United States Patent

Brueckner

(10) Patent No.: US 9,843,628 B2
(45) Date of Patent: Dec. 12, 2017

(54) DISTRIBUTED DYNAMIC ARRANGEMENT OF APPLICATION AGENTS

(71) Applicant: Axon AI, LLC, Harrisonburg, VA (US)

(72) Inventor: Sven Brueckner, Harrisonburg, VA (US)

(73) Assignee: Axon AI, LLC, Harrisonburg, VA (US)

( * ) Notice: Subject to any disclaimer, the term of this patent is extended or adjusted under 35 U.S.C. 154(b) by 191 days.

(21) Appl. No.: 14/717,645

(22) Filed: May 20, 2015

(65) Prior Publication Data

US 2015/0341423 A1 Nov. 26, 2015

Related U.S. Application Data

(60) Provisional application No. 62/001,212, filed on May 21, 2014.

(51) Int. Cl.
*G06F 15/16* (2006.01)
*H04L 29/08* (2006.01)
*G06F 17/30* (2006.01)

(52) U.S. Cl.
CPC ........ *H04L 67/10* (2013.01); *G06F 17/30958* (2013.01)

(58) Field of Classification Search
CPC ....... H04L 63/104; H04L 67/10; H04L 67/34; H04L 67/104; G06F 3/04815; G06F 17/30595; G06F 9/54; G06F 17/30958; G01S 5/0072; H04B 10/1129
See application file for complete search history.

(56) References Cited

U.S. PATENT DOCUMENTS

| | | | |
|---|---|---|---|
| 7,782,866 B1* | 8/2010 | Walsh | H04L 63/104 370/395.31 |
| 7,840,903 B1* | 11/2010 | Amidon | G06F 3/04815 715/733 |
| 2006/0188327 A1* | 8/2006 | Moon | G01S 5/0072 403/325 |
| 2013/0097130 A1 | 4/2013 | Bingol et al. | |
| 2014/0059017 A1* | 2/2014 | Chaney | G06F 17/30595 707/692 |
| 2015/0023668 A1* | 1/2015 | Spaulding | H04B 10/1129 398/106 |

* cited by examiner

*Primary Examiner* — Dustin Nguyen
(74) *Attorney, Agent, or Firm* — Dinsmore & Shohl LLP

(57) ABSTRACT

Autonomous computational processes ("agents") representing application-specific data items (e.g., representations of real-world entities or events, any-media documents, models, etc.) are provided with application-independent methods and data structures to arrange themselves (according to application specific relationship measures) relative to other such agents even when the agents' ability to sense or communicate with other agents is limited relative to the extent of the overall collection. A continuously executing arrangement decision process executed by each agent modifies the agent's position in the chosen topology (e.g., metric space, graph structure) such that the chosen distance measure between agent positions approximates the relationship structure among the currently available data-items. A separate information exchange process executed by the agents ensures that knowledge about the position and data-item of other agents is made available to the arrangement decision process without requiring high-volume communication.

14 Claims, 4 Drawing Sheets

DISTRIBUTED DYNAMIC ARRANGEMENT OF APPLICATION AGENTS

REFERENCE TO RELATED APPLICATION

This application claims priority from U.S. Provisional Patent Application Ser. No. 62/001,212, filed May 21, 2014, the entire content of which is incorporated herein by reference.

FIELD OF THE INVENTION

This invention relates generally to information processing and, in particular, to a method of arranging representations of real-world entities or data items according to pair-wise, application-specific relationship measures using autonomous agents within a distributed computing environment.

BACKGROUND OF THE INVENTION

In many applications, reasoning over very large and continuously changing collections of data items (e.g., representations of real-world entities or events, any-media documents, models, etc.) requires that instances of the reasoning process are presented with small subsets of the collection at a time where the quality of the reasoning improves if the members of the subset are related to each other by some application-specific measure. A classic example of such a requirement is the search of persistent user-defined queries for relevant documents, where documents with similar content representations should be grouped together and away from dissimilar documents such that the search process can discover them together.

With the overall collection of data items being very large, it may be necessary to spread the data items across a distributed computing environment and to decentralize the process that arranges data items for the joint consumption of the reasoning processes. That decentralization of this arrangement process may be accomplished by associating each data item with an autonomous software agent (e.g., an independent thread that repeatedly applies a set of decision rules based on currently available information). The role of the agent is to assess the application-specific relation between its data item and other data items in the collection and arrange for its data item to be presented together with other ones that relate closely.

With the additional challenge of continuously changing data items as well as the possible arrival and departure of data items at any time, ensuring that data items that need to be grouped together can find each other fast enough to be useful to the reasoning processes becomes a major challenge. With the need for distribution of the data items in the first place, it is unrealistic to assume the availability of sufficient communications resources between the elements of the distributed computing environment such that the agent of every data item may have complete awareness of the up-to-date state of all other data items. There remains an outstanding need for a continuously refining agent-based arrangement method for data items that may operate on incomplete and potentially outdated information.

SUMMARY OF THE INVENTION

The general purpose of the present invention is to provide autonomous computational processes ("agents") representing application-specific data items (e.g., representations of real-world entities or events, any-media documents, models, etc.) with application-independent methods and data structures. These methods and data structures enable the agents to arrange themselves relative (according to application specific relationship measures) to other such agents, even when the agents' ability to sense or communicate with other agents is limited relative to the extent of the overall collection.

The agents embodying this invention are data structures in computational processes executed by one or many processors on a single or a collection of hardware platforms, where each such data structure references a location in a metric space. Any memory maintained by the agents as part of this invention is presumed to be computer memory (e.g., Random Access Memory (RAM), processor cache, (temporary) files stored on internal or external hard disks, databases). The relative arrangement of the agents may but does not need to correspond to the physical arrangement of the hardware platforms that execute the agents' repeated decision process.

Preferred realizations of the agent-based arrangement of data items include but are not limited to:
- the association of each agent with coordinates in a metric space, such as for instance a unit space volume as presented in [1], with the arrangement process manipulating agent coordinates according to distance as defined in the particular space, or
- the association of each agent with a unique node in a graph topology, such as for instance a peer-to-peer overlay as assumed in [2], with the arrangement process manipulating the agent's node's links to other nodes according to the associated data items' relationships.

DETAILED DESCRIPTION OF THE INVENTION

This invention provides an agent-based distributed and decentralized solution to the problem of arranging a continuously changing collection of "data items" according to pair-wise data-item relationship measures. In accordance with the method, groupings of related, and dispersions of unrelated, data items emerge that optimize the presentation of small, well-organized subsets of data-items to other reasoning processes. The invention presents an application-independent solution without making any assumptions about the application-specific nature of the data items or their relationship measures.

Underlying this invention are the following architectural assumptions and terminology:

Relevant information about an application-specific entity that may correspond to physical real-world entity (e.g., robotic vehicles) or that may correspond to a discrete information unit (e.g., document) is captured in a data-item.

There are many such data-items, potentially spread over a distributed computing environment.

The information in a data-item changes when the corresponding application-specific entity changes.

Over time, new data-items may be added to the collection or removed from it.

For the duration of its presence in the collection, each data-item is associated with an autonomous agent that maintains and continuously refines the data-item's "position" in the overall arrangement. Preferred realizations of an agent's position relative to other agents include but are not limited to:

the assignment of each agent to a coordinate in an arbitrary metric space, such as for instance a unit space volume as presented in [1], where the resulting arrangement of data-items is expressed in the relative distances (as defined in the specific space) of agent coordinates, or the assignment of each agent to a unique node in a graph topology, such as for instance a peer-to-peer overlay as assumed in [2], where the resulting arrangement of data-items is expressed in the relative distances (e.g., length of shortest path) of agent nodes.

Each agent continuously re-evaluates its position relative to other agents based on the application-specific relationship measure of its data-item to the other agents' data-items. As a result, the agent may change its position such that it effectively reduces or increases its distance to the other agents, regardless the specific definition of distance in the chosen realization. Which other agents are considered in any given decision cycle depends on the agent's access to information about other agents and their data items in the specific realization.

Figure 1:
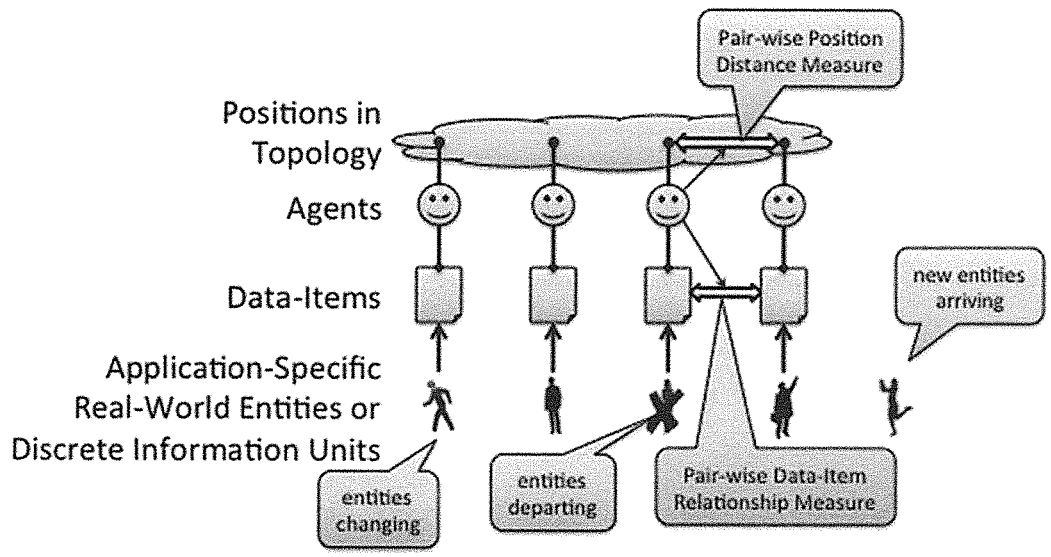
FIG. 1 illustrates a General Architecture wherein dynamically updated information about application domain entities is stored in Data-Items that are each associated with an Agent that has a Position in a Topology. The agent has the ability to measure both, the application-specific relationship between its Data-Item and another, as well as the application-independent distance between its Position in the chosen topology relative to another agent's Position.
Figure 2:
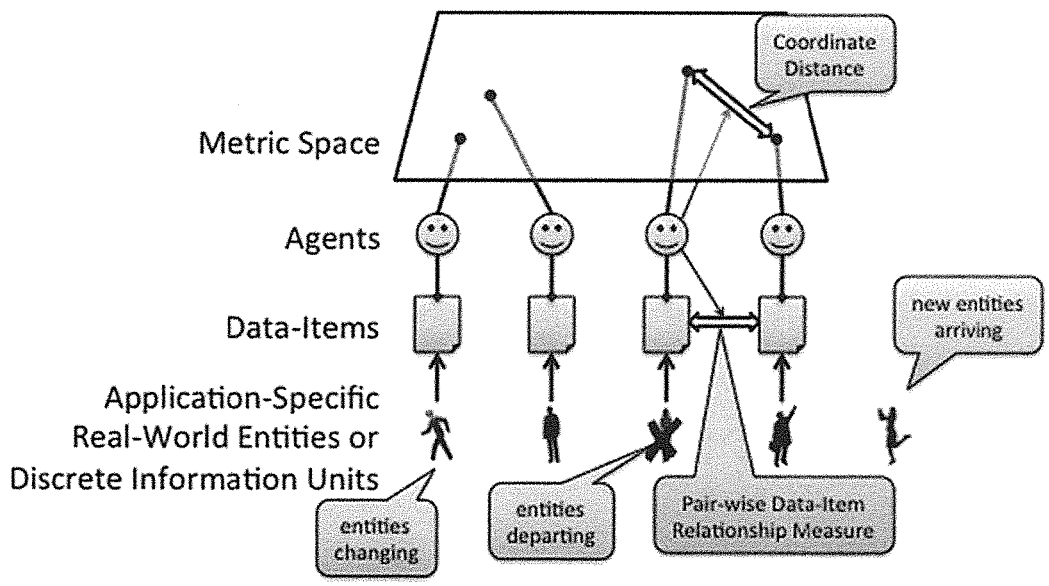
FIG. 2 depicts a Preferred Realization wherein agent positions are coordinates in a metric space and distance is computed in the traditional Euclidian way.
Figure 3:
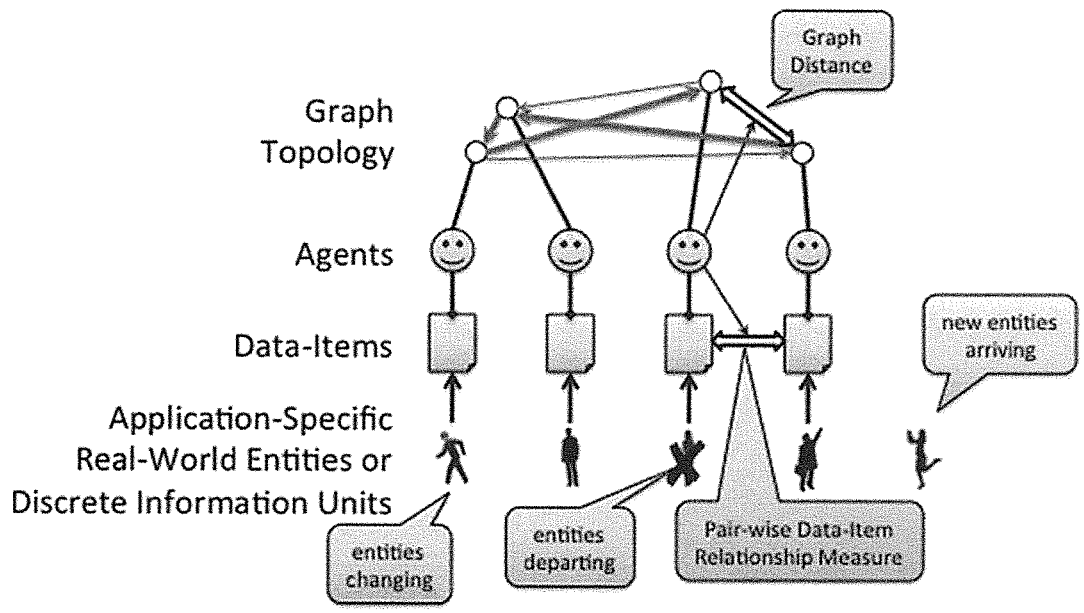
FIG. 3 shows a Preferred Realization wherein agent positions are nodes in a graph topology that defines distances by topological measures (e.g., shortest path length)

FIG. 1 illustrates these architectural assumptions in general and FIGS. 2 and 3 show the two preferred realizations respectively.

The Agents' Arrangement Decision Process

The invention prescribes the following arrangement decision process to be continuously repeated by the autonomous software agent representing a single data-item in the current collection. To simplify this description, we name this agent "A" while all other agents are referred to as "$o_i$" (with $o_i \mathrel{!}= A$).

Step 1: Enumerate all other agents, for which A currently has position and data-item information. These "known" agents form A's current Interaction Set $\{o^A_1, o^A_2, \ldots, o^A_n\}$.

Step 2: For each agent $o^A_i$ in A's current Interaction Set,

Step 2.a: determine A's distance to the known position of $o^A_i$ in the chosen realization of the agent-to-agent distance measurement function Step 2.b: determine A's relationship measure to the known data-item of $o^A_i$ in the chosen application-specific pair-wise data-item relationship measurement function Step 2.c: combining the distance and relationship measure through a realization-specific valence function, determine whether and to what degree A should change its position distance (reduce or increase) relative to $o^A_i$ Step 3: Combine the desired position changes across all elements in A's current Interaction Set into this decision cycle's position modification plan Step 4: Execute the position modification plan, changing A's position The realization of this arrangement decision process depends on the chosen realization of the agent position and distance measures. Preferred realizations include, but are not limited to:

Agent positions are coordinates in a unit space volume that determines their distances as described in [1]. This realization refines some of the arrangement decision process steps as follows:

Step 2.a determines A's distance to the known unit space coordinates of $o^A_i$ using the unit-space distance measure.

The result of Step 2.c (position distance change to $o^A_i$) takes the form of a vector in unit space.

The combination of desired decision changes in Step 3 may be realized by the summation of all change vectors computed in Step 2.c with the additional application of constraints or weights as appropriate for the application. The result is a single change vector in unit space.

The execution of the position modification plan in Step 4 applies the combined change vector from Step 3 to the current position of A, applying additional constraints (e.g., limit maximum change) as appropriate for the application.

Note that this realization may be implemented as a special case of [3].

Agent positions are nodes in a graph topology where distances are defined by topological measures over the current link structure (e.g., length of shortest path between two agent nodes, membership in $n^{th}$ neighborhood set of the agent's node where the $1^{st}$ such set are all immediate neighbors, the $2^{nd}$ are all immediate neighbors of the members of the $1^{st}$ set that are not also members of the $1^{st}$ set or the agent's node itself, and so on). This realization refines some of the arrangement decision process steps as follows:

Step 2.a determines A's distance to the known graph nodes of $o^A_i$ using the chosen graph-distance measure.

The result of Step 2.c (position distance change to $o^A_i$) takes the form of changes to A's node's immediate neighborhood, specifically adding new or removing existing neighbors.

The combination of desired decision changes in Step 3 may be realized by a down-select from all topology changes proposed in Step 2.c with the additional application of constraints or weights as appropriate for the application. For instance, A may choose to perform only one such change and select it probabilistically from the set of proposals. The result is a set of topology changes affecting the immediate graph neighborhood of A.

The execution of the position modification plan in Step 4 performs the topology changes from Step 3 to the graph node of A, applying additional constraints (e.g., prevent any node from reaching a node degree of zero) as appropriate for the application.

Figure 4:
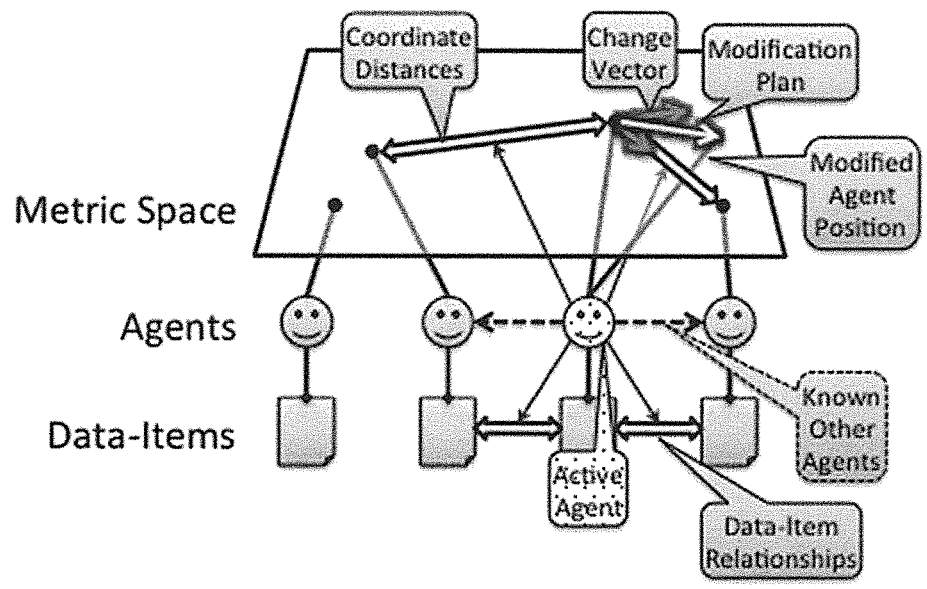
FIG. 4 illustrates an Arrangement Decision wherein Agent Positions are coordinates in a Metric Space.
Figure 5:
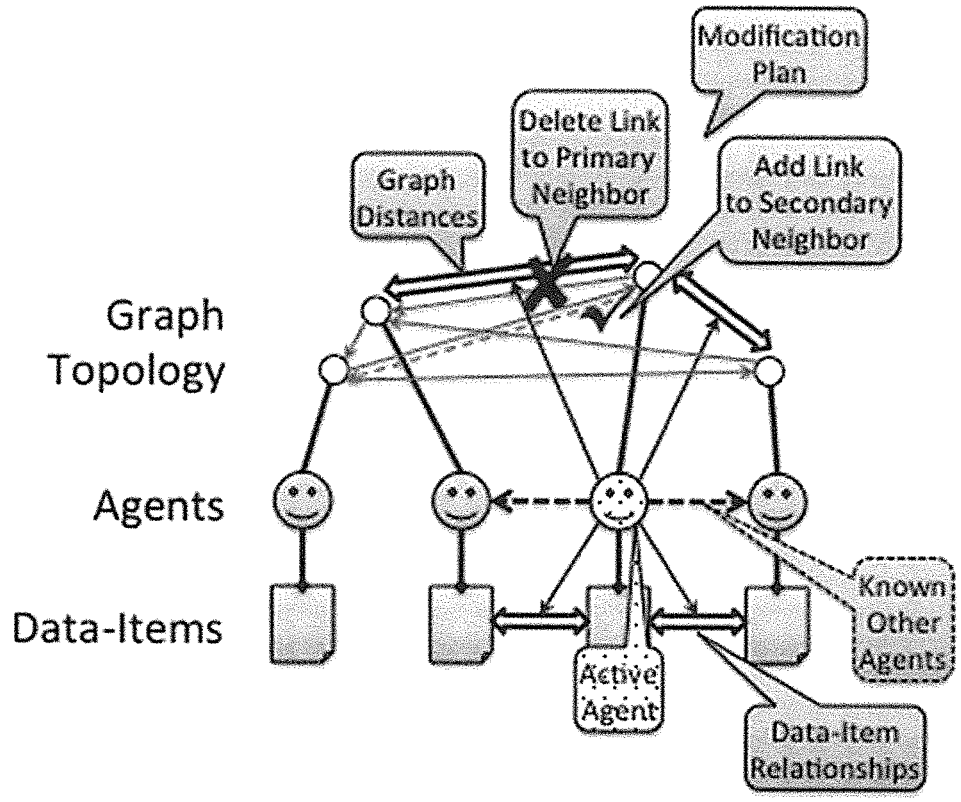
FIG. 5 illustrates an Arrangement Decision wherein Agent Positions are nodes in a Graph Topology.

FIGS. 4 and 5 illustrate the arrangement decision process in the two preferred realizations, respectively.

Providing Agents with Information About Other Agents

Step 1 in the agent's arrangement decision process states: "Enumerate all other agents, for which A currently has position and data-item information. These "known" agents form A's current Interaction Set $\{o^A_1, o^A_2, \ldots, o^A_n\}$." NOT assuming that any agent may always have immediate and error-free knowledge about all (or even a subset of) other agents is a key element of the invention to solve the problem of distributed information storage and agent execution under real-world data exchange constraints. Instead, this invention prescribes the existence of an information exchange process executed by the agents independent of their arrangement decision process.

The invention prescribes that each agent maintains an internal data structure (in addition to its own position and data-item information) where it maintains a collection of references to other agents with their position and data-item information and, in addition, a probability estimate of the correctness of that information that the agent seeks to maximize. As already stated in the prescription of the agents' arrangement decision process, we refer to this data structure as the currently "known" other agents.

U.S. Provisional Application Ser. No. 62/004,597 defines a "Gossip Memory" (GM) comprising multiple "Gossip Memory Items" (MI) that is a preferred realization of the data structure of currently "known" other agents in this present invention. According to the definition, an MI contains information about the entity that produced the item ("Gossip Producer", GP) with the intent that it is being shared among other agents ("Gossip Sharer", GS) and used in other agents' decision processes ("Gossip Consumer", GC). The additional "weight" element in the special case of a "Weighted Memory Item" (WMI) is a preferred realization of the probability of correctness estimate required by the present invention as the weight value is 100% at the moment the WMI is created by the GP and then decayed over time as the WMI is shared among the agents.

In the context of [4], the agents in the present invention realize their information spreading process by acting, concurrently, as Gossip Producer (generating a WMI for other agents in their Interaction Set), Gossip Sharer (passing on WMI about other agents), and Gossip Consumer (using WMI information to make their arrangement decisions).

The invention prescribes the following information exchange process to be continuously repeated by the autonomous software agent representing a single data-item in the current collection. To simplify this description, we name this agent "A".

Step 1: Enumerate all other agents or supporting data carrying elements that are currently available for direct interaction with A. The availability for interaction is constrained by the agents' position in the chosen topology. These "in-range" entities form A's current Information Source Set $\{s^A_1, s^A_2, \ldots, s^A_n\}$.

Step 2: For each member $s^A_i$ of A's Information Source Set,

Step 2.a: query $s^A_i$ for information about other agents (their position, data-item) and the associated probability estimate of the correctness of that information.

Any information about another agent that is not already in the set of currently "known" other agents may be added to that data structure.

Any information about another agent that is already in the set of currently "known" other agents may be added to that data structure if the new information carries a higher probability of correctness than the corresponding entry in the A's "known" other agents data structure.

Step 2.b: offer $s^A_i$ the content of A's "known" other agents data structure as well as A's own position and data-item state.

A preferred, but not necessarily the only realization of the information exchange process, is defined generally in [4]. Depending on the chosen realization of the agent position and distance measures in the arrangement process, realizations of [4] may be preferred but not limited to the prescriptions in [5] or [2].

In addition to the information exchange process prescribed by this invention, it also prescribes an information correctness estimate decay process per agent that reduces the correctness estimate value for each entry in A's "known" other agents data structure over time and may remove it if it falls below an application-defined threshold. A preferred, but not necessarily the only realization of this process is defined in [4] utilizing the Weighted Memory Item implementation of the entries in the "known" data structure.

Figure 6:
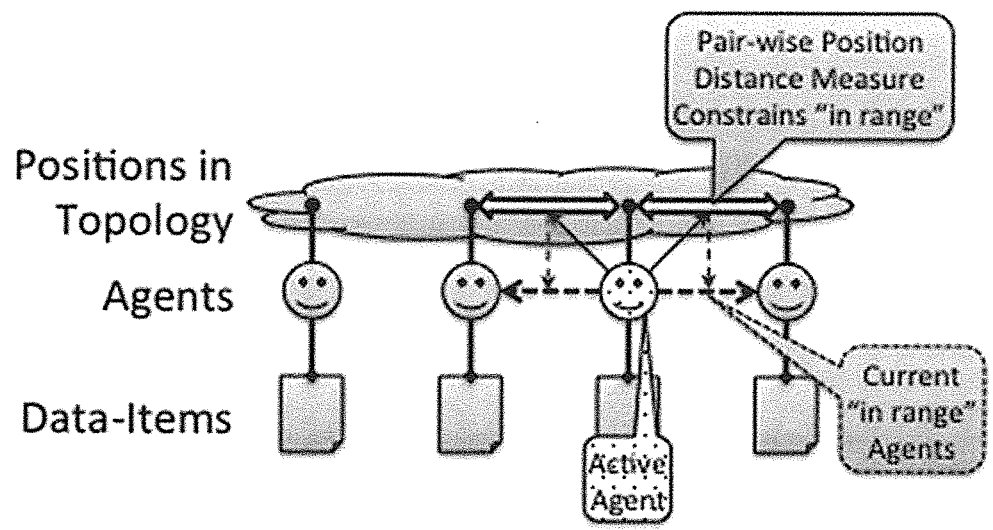
FIG. 6 illustrates an Information Exchange Step 1 that determines the current Interaction Set ("in-range") from the topology position of other agents or supporting data-carrying elements (not shown here)
Figure 7:
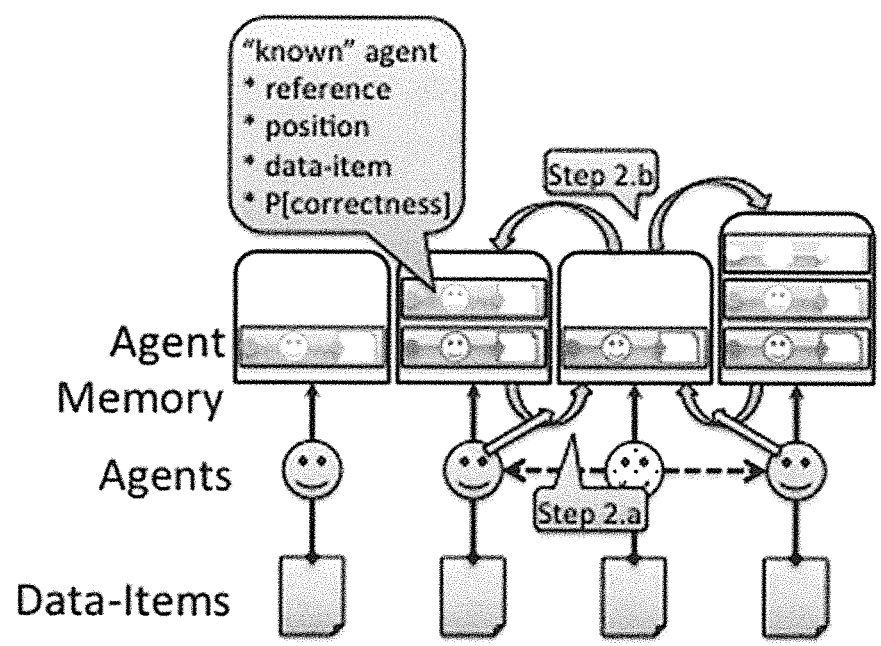
FIG. 7 illustrates an Information Exchange Step 2 including exchange information about other agents to (Step 2.a) and from (Step 2.b) the active agent—including reference to the agents in the current Information Source Set.

FIGS. 6 and 7 illustrate the two steps of the information exchange process in its general definition.

REFERENCES

[1] S. Brueckner, "An Abstract Unit Space Volume for Entity Movement," AXON Ghost Sentinel, Inc., Provisional Application USPTO 62/011,638, June 2014.

[2] S. Brueckner, "Efficient Information Spreading with Gossiping in Peer-to-Peer Networks," AXON Ghost Sentinel, Inc., Provisional Application USPTO 62/007,194, June 2014.

[3] S. Brueckner, "Multi-Objective & Constrained Entity Walk," AXON Ghost Sentinel, Inc., Preliminary Application USPTO 62/007,165, June 2014.

[4] S. Brueckner, "Generalized Gossiping for Decentralized Information Spreading," AXON Ghost Sentinel, Inc., Provisional Application USPTO 62/004,597, May 2014.

[5] S. Brueckner, "Efficient Information Spreading with Gossiping in a Metric Space," AXON Ghost Sentinel, Inc., Provisional Application USPTO 62/011,234, June 2014.

The invention claimed is:

1. A method of automatedly arranging continuously changing collections of data-items representing application-specific entities using autonomous agents in a distributed and decentralized computational environment, the method comprising the steps of:

providing a single or many computer processors;

associating each data-item with an autonomous software agent, each agent being operative to perform two independent processes, including an arrangement process and an information exchange process;

continuously and repeatedly executing the processes by the agents, on the single or many computer processors, to arrange the data-items in accordance with an application-specific pair-wise relationship measure; and providing each agent with an internal 'known agents' data structure containing, at a minimum, one or more of the following:
- a unique reference to another agent,
- a topology position stored for the referenced agent,
- a data-item stored for the referenced agent, and
- a combined correctness probability measure relative to the current state of the referenced agent for the stored information;

wherein each agent, defined as "A," is further operative to perform the following steps:

(a) enumerate all other agents for which A currently has entries in its "known agents" data structure, and wherein the references to these agents form A's current Interaction Set $\{o^A_1, o^A_2, \ldots, o^A_n\}$;

(b) for each agent $o^A_i$ in A's current Interaction Set:
  (i) determine A's distance to the known position of $o^A_i$ in a chosen realization of the agent-to-agent position-distance measurement function,
  (ii) determine A's relationship measure to the known data-item of $o^A_i$ in the chosen application-specific pair-wise data-item relationship measurement function, and
  (iii) combine the distance and relationship measure through a realization-specific valence function, determine whether and to what degree A should reduce or increase its position distance relative to $o^A_i$;

(c) combine the desired position changes across all elements in A's current Interaction Set into this decision cycle's position modification plan; and (d) execute the position modification plan, changing A's position.

2. The method of claim 1, wherein the data-items are application-specific representations of information about physical objects, humans, organizations, events or other real-world entities.

3. The method of claim 1, wherein the data-items are application-specific representations of text, audio, video, sensor data or stored information content.

4. The method of claim 1, including the step of adding or removing the data-items from the environment as corresponding application-specific entities are added to or removed from the application.

5. The method of claim 1, including the step of assigning each agent a position in a topology that the agent is able to manipulate.

6. The method of claim 5, wherein each agent is able to estimate the distance between its position in the topology relative to another given position value.

7. The method of claim 1, including the step of providing each agent with access to the current content of its data-item and the ability to apply an application-specific relationship function between its data-item and any other data-item in the environment.

8. The method of claim 1, wherein the known agents data structure is implemented as a Gossip Memory with entries realized as Weighted Memory Items, and wherein the weight of the respective memory item is proportional to the combined correctness probability.

9. The method of claim 1, wherein each agent's position is a coordinate in a unit-space volume or other metric space with position-distance measures defined by that space, and wherein:

step (b)(i) determines the agent A's distance to the known space coordinates of $o^A_i$ using the space's distance measure;

the result of step (b)(iii) takes the form of a vector in the chosen metric space;

the combination of desired decision changes in step (c) are realized by the summation of all change vectors computed in step (b)(iii) with the additional application of constraints or weights as appropriate for the application, the result being a single change vector in the chosen metric space;

the execution of the position modification plan in step (d) applies a combined change vector from step (c) the current position of agent A.

10. The method of claim 9, wherein the execution of the position modification plan limits maximum change or applies another additional constraint as appropriate to the application.

11. The method of claim 1, wherein each agent's position is a unique node in a graph topology with distances being defined by topological measures over a current link structure between the nodes, and wherein:

step (b)(i) determines A's distance to the known graph nodes of $o^A_i$ using a chosen graph-distance measure;

the result of step (b)(iii) takes the form of changes to A's node's immediate neighborhood, specifically adding new or removing existing neighbors on agent A's graph node;

the combination of desired decision changes in (c) is realized by a down-select from all topology changes proposed in step (b)(iii), with the additional application of constraints or weights as appropriate for the application, with the result being a set of topology changes affecting the immediate graph neighborhood of the node position of A; and the execution of the position modification plan in step (d) performs topology changes from step (c) to the graph node of A.

12. The method of claim 11, wherein the execution of the position modification plan prevents any node from reaching a node degree of zero or applies another additional constraint as appropriate to the application.

13. A method of automatedly arranging continuously changing collections of data-items representing application-specific entities using autonomous agents in a distributed and decentralized computational environment, the method comprising the steps of:

providing a single or many computer processors;

associating each data-item with an autonomous software agent, each agent being operative to perform two independent processes, including an arrangement process and an information exchange process;

continuously and repeatedly executing the processes by the agents, on the single or many computer processors, to arrange the data-items in accordance with an application-specific pair-wise relationship measure; and providing each agent with an internal 'known agents' data structure containing, at a minimum, one or more of the following:
- a unique reference to another agent,
- a topology position stored for the referenced agent,
- a data-item stored for the referenced agent, and
- a combined correctness probability measure relative to the current state of the referenced agent for the stored information;

wherein each agent, defined as "A," is further operative to perform the following steps:

(a) enumerate all other agents or supporting data carrying elements that are currently available for direct interaction with agent A, and wherein the availability for each interaction is constrained by the agents' position in the chosen topology, and wherein these "in-range" entities form A's current Information Source Set $\{s^A_1, s^A_2, \ldots, s^A_n\}$;

(b) for each member $s^A_i$ of A's Information Source Set:
   (i) query $s^A_i$ for information about other agents (their position, data-item) and the associated probability estimate of the correctness of that information,
   (ii) any information about another agent that is not already in the set of currently 'known' other agents may be added to that data structure,
   (iii) any information about another agent that is already in the set of currently 'known' other agents may be added to that data structure if the new information carries a higher probability of correctness than the corresponding entry in the A's 'known' other agents data structure; and (c) offer $s^A_i$ the content of A's 'known' other agents data structure as well as A's own position and data-item state.

14. The method of claim 13, wherein:

(d) any agent concurrently fulfills a Gossip Producer or Gossip Consumer role; and (e) there exists a secondary population of Gossip Sharer agents that continuously move through the chosen position topology.

* * * * *